UNITED STATES PATENT OFFICE.

JOHANNES JANSEN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

AZO DYE.

933,841.  Specification of Letters Patent.  Patented Sept. 14, 1909.

No Drawing.  Application filed February 3, 1909. Serial No. 475,816.

*To all whom it may concern:*

Be it known that we, JOHANNES JANSEN and WILHELM NEELMEIER, doctors of philosophy, chemists, citizens of the German Empire, residing at Leverkusen, near Cologne, Germany, have invented new and useful Improvements in New Azo Dyestuffs, of which the following is a specification.

Our invention relates to the manufacture and production of new coloring matters capable of dyeing on a mordant.

The new dyestuffs are obtained by combining the diazo compounds of such orthoaminophenol derivatives which contain either nitro groups or halogens or both nitro groups and halogens but no sulfonic or carboxylic groups with substituted meta-aminophenols having the formula:

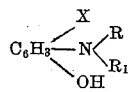

(X meaning hydrogen or methyl, R meaning hydrogen, alkyl or aryl, $R_1$ meaning alkyl or aryl).

The new products possess the valuable property that they can be dyed on wool together with bichromate in the same bath. They can also be dyed on a chrome mordant or according to the after-chroming method. The dyeing in one bath is best done by adding the dye with the bichromate to the bath, entering the wool, boiling, adding acetic acid in small portions and boiling again. Red to violet to black shades fast to light are thus obtained.

The new dyestuffs are dark powders soluble in water generally with a red to violet color, and soluble in concentrated sulfuric acid generally with a red to brown color. They yield upon reduction with stannous chlorid and hydrochloric acid orthoaminophenol derivatives and substituted diaminophenols having the general formula:

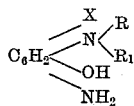

(X, R and $R_1$ having the above given meaning).

In carrying out our new process practically we can proceed as follows, the parts being by weight:

Example:—188.5 parts of 5-nitro-4-chloro-2-aminophenol are diazotized in the usual manner by means of hydrochloric acid and 7 parts of sodium nitrite. The diazo compound is then added to an aqueous solution, which has to be stirred, until the combination is finished, of 137 parts of meta-oxydimethylanilin in an acetic acid or alkaline solution. The dyestuff is isolated in the usual way. It is a dark powder which is soluble in water with a violet and which is soluble in concentrated sulfuric acid with a red color. By reduction with stannous chlorid and hydrochloric acid 2.5-diamino-4-chlorophenol and 3-dimethylamino-6-amino-1-phenol are obtained. It dyes wool according to the above described method bluish-violet shades of good fastness to light.

The process is carried out in an analogous manner on starting from other alkylated or arylated meta-aminophenols e. g. meta-oxydiphenylamin, 2-monomethylamino-4-cresol ($CH_3 : NH.CH_3 : OH = 1:2:4$), 2-monoethylamino-4-cresol ($CH_3 : NH.C_2H_5 : OH = 1:2:4$), 2-dimethylamino-4-cresol ($CH_3 : N(CH_3)_2 : OH = 1:2:4$) etc. Other orthoaminophenol derivatives may be used, such as 4-chlorol-2-aminophenol, 4.6-dichloro-2-aminophenol, 4-nitro-2-aminophenol, 5-nitro-2-aminophenol, picramic acid, 6-chloro-4-nitro-2-aminophenol, 6-nitro-4-chloro-2-aminophenol, 6-methyl-4-nitro-2-aminophenol, 4-methyl-6-nitro-2-aminophenol, 2.4-dinitro-3-methyl-6-aminophenol, etc.

Having now described our invention and in what manner the same is to be performed, what we claim as new and desire to secure by Letters Patent is:—

1. The herein-described azo dyes derived from substituted metaamino phenols having the formula above given combined with orthoaminophenol derivatives that have no sulfonic or carboxylic groups but contain nitro groups or halogens, and which dyestuffs are, after being dried and pulverized, dark powders soluble in water generally with a red to violet color, soluble in concentrated sulfuric acid generally with a red to brown color; yielding upon reduction with stannous chlorid and hydrochloric acid orthoaminophenol derivatives and substituted diaminophenols having the above given formula; and dyeing wool together with bichromate and acid in the same bath from red to violet to black shades, substantially as described.

2. The herein-described new azo dyestuff obtainable from 5-nitro-4-chloro-2-aminophenol and meta-oxydimethylanilin, which dyestuff is, after being dried and pulverized, a dark powder soluble in water with a violet color and soluble in concentrated sulfuric acid with a red color; yielding upon reduction with stannous chlorid and hydrochloric acid 2.5-diamino-4-chloro-phenol and 3-dimethylamino-6-amino-1-phenol; and dyeing wool together with bichromate and acid in the same bath bluish-violet shades fast to light, substantially as described.

In testimony whereof we have hereunto set our hands in the presence of two subscribing witnesses.

JOHANNES JANSEN. [L. S.]
WILHELM NEELMEIER. [L. S.]

Witnesses:
 OTTO KÖNIG,
 WM. WASHINGTON BRUNSWICK.